(12) United States Patent
Cloutier et al.

(10) Patent No.: US 7,317,926 B1
(45) Date of Patent: *Jan. 8, 2008

(54) SYNCHRONOUS TRANSMISSION OF DATA WITH NETWORK REMOTE CONTROL

(75) Inventors: Jocelyn Cloutier, Menlo Park, CA (US); Allen E. Milewski, Holmdel, NJ (US); Thomas M. Smith, Westfield, NJ (US)

(73) Assignee: AT&T Corporation, Bedminster, NJ (US)

( * ) Notice: Subject to any disclaimer, the term of this patent is extended or adjusted under 35 U.S.C. 154(b) by 197 days.

This patent is subject to a terminal disclaimer.

(21) Appl. No.: 10/878,507

(22) Filed: Jun. 28, 2004
(Under 37 CFR 1.47)

Related U.S. Application Data

(63) Continuation of application No. 09/736,430, filed on Dec. 15, 2000.

(51) Int. Cl.
*H04Q 7/20* (2006.01)

(52) U.S. Cl. ............... 455/456.3; 386/46; 348/735; 701/211; 455/414.3; 455/3.06

(58) Field of Classification Search ......... 455/414.1, 455/422.1, 427, 450, 455, 456.3, 414.3, 3.06; 370/399, 395, 401, 352; 709/201, 231, 238; 710/128; 701/211; 348/14.07, 14.09; 386/46
See application file for complete search history.

(56) References Cited

U.S. PATENT DOCUMENTS

| | | | |
|---|---|---|---|
| 5,406,322 A * | 4/1995 | Port et al. ............. | 348/14.07 |
| 5,974,043 A | 10/1999 | Solomon | |
| 5,990,933 A * | 11/1999 | Ozone et al. .......... | 348/14.09 |
| 6,148,253 A | 11/2000 | Taguchi | |
| 6,317,425 B1 | 11/2001 | Kim | |
| 6,317,585 B1 * | 11/2001 | Shibasaki ............. | 455/13.2 |
| 6,333,750 B1 * | 12/2001 | Odryna et al. ........ | 345/629 |
| 6,377,972 B1 * | 4/2002 | Guo et al. ............. | 709/201 |
| 6,504,990 B1 | 1/2003 | Abecassis | |
| 6,795,711 B1 | 9/2004 | Sivula | |

(Continued)

FOREIGN PATENT DOCUMENTS

JP     10308759 A   *  11/1998

*Primary Examiner*—Joy K. Contee
(74) *Attorney, Agent, or Firm*—Michael Haynes PLC; Michael N. Haynes; Dale R. Jensen

(57) ABSTRACT

A novel method and apparatus is disclosed for synchronously delivering complementary data to two devices. Complementary data is used herein to designate at least two streams of related data that, when combined, form an organic whole. In one embodiment of the disclosed invention, a command is received through a network for the synchronous transmission of complementary data. Subsequently, first data is transmitted through the network to a first device synchronized with transmission of second data to a second device, wherein the first and second data are complementary data.

In one embodiment of the invention, a mobile and/or handheld device such as a PDA is used to control another device remotely through one or more networks, such that complementary, synchronous streams of data that are intended for observation in combination by users and/or entities, can be transmitted to each of the PDA and the device. The flexibility of such an arrangement, wherein the PDA can be carried to different locations to control different devices for synchronous transmission of complementary data, allows the provision of a multitude of services not heretofore available.

12 Claims, 3 Drawing Sheets

U.S. PATENT DOCUMENTS

| | | | |
|---|---|---|---|
| 6,870,827 B1 * | 3/2005 | Voit et al. | 370/352 |
| 7,028,264 B2 * | 4/2006 | Santoro et al. | 715/765 |
| 7,158,797 B1 * | 1/2007 | Jayaraman et al. | 455/456.1 |
| 2002/0052559 A1 | 5/2002 | Watrous | |
| 2002/0098852 A1 * | 7/2002 | Goren et al. | 455/456 |
| 2005/0207672 A1 * | 9/2005 | Bernardo et al. | 382/284 |

* cited by examiner

SYNCHRONOUS TRANSMISSION OF DATA WITH NETWORK REMOTE CONTROL

CROSS-REFERENCES TO RELATED APPLICATIONS

This application is a continuation of, claims priority to, and incorporates by reference herein in its entirety pending U.S. patent application Ser. No. 09/736,430, filed 15 Dec. 2000.

BACKGROUND OF THE INVENTION

The present invention relates to the field of remote control of devices in networks. In particular, the present invention is concerned with remotely controlling the transmission of complementary data over networks.

The development of networks has led to the development of many beneficial network services, especially in the area of communication. However, networks can also be and have been used for controlling devices that are connected to other devices through such networks. For example, in voice mail messaging systems, voice mail servers are routinely controlled by phones connected to voice mail servers through the Public Switched Telephone Network.

One area which has lacked sufficient attention in the context of the remote control of devices through networks has been in the provision of data services. In particular, there is a need for devices that can be remotely controlled to transmit synchronous, complementary data to a plurality of devices over a network.

SUMMARY OF THE INVENTION

A novel method and apparatus is disclosed for synchronously delivering complementary data to two devices. The steps in one method embodiment of the present invention comprise: i) receiving a command through a network for synchronous transmission of complementary data, and ii) transmitting first data through a network to a first device, the transmission of the first data synchronized with transmission of second data transmitted to a second device, the first and second data forming complementary data.

DETAILED DESCRIPTION

Embodiments of the present invention allow for the synchronous transmission of complementary data to two devices.

In one embodiment of the invention, a mobile and/or hand-held device such as a PDA is used to control another device remotely through one or more networks, such that complementary, synchronous streams of data that are intended for observation in combination by users and/or entities, can be transmitted to each of the PDA and the device. The flexibility of such an arrangement, wherein the PDA can be carried to different locations to control different devices for synchronous transmission of complementary data, allows the provision of a multitude of services not heretofore available.

Figure 1:
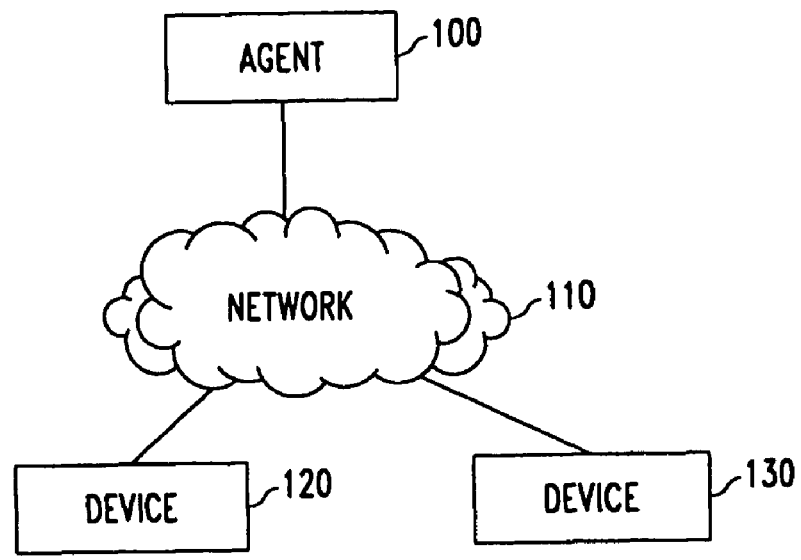
FIG. 1 illustrates a system in accordance with embodiments of the present invention.

FIG. 1 shows a system in accordance with embodiments of the invention. In FIG. 1, a first device 120 and a second device 130 are connected to network 110. Network 110 may be any type of network, for example, the Internet, an intranet, a television network, a wireless network, a public switched telephone network, a combination of these networks, or any other network. Moreover, network 110 may include two different networks connected by a gateway; for example, network 110 may include any two of the networks above connected by a gateway server allowing for the communication of data and commands from each network to the other.

Device 120 and device 130 are devices which are capable of receiving data transmitted through network 110. In particular, device 120 and device 130 are capable of receiving complementary data. "Complementary data" is used herein to designate at least two streams of related data that are semantically related to each other such that, when combined, form an organic whole. For example, the audio data and the video data for a television program may be considered to be complementary data.

One other property of complementary data as used herein is that the at least two streams of data are intended for observation by the same entity or person, or are actually observed by the same entity or person. For example, a video signal in a video program that is observed by many users is complementary to audio data of the program that is played on each user's individual player (e.g. in different languages). However, first computer game data that is streamed to a video monitor of a first user is not complementary to second computer game data that is streamed to a video monitor for a second user, where the first user is playing the computer game with or against the second user, because the first data is intended for observation by the first user alone, whereas the second data is intended for observation by the second user alone.

Another property of complementary data as used herein is that at least one stream of data is not broadcast; it is either unicast to a single user or device, or multicast to a predetermined list of users and/or devices. As is known in the art, unicast and multicast require a predetermined list of users and/or devices to which transmission is to be made. Such a list may be as simple as a list of network addresses, or may include additional information.

Additionally, device 120 and 130 are capable of synchronously playing back, displaying and/or transmitting streams of data. Two streams of data may be considered to be synchronously played back, displayed and/or transmitted if the play back, display or transmission of each stream has a special temporal relation to that of the other, such that the streams of data in combination are properly perceived by an observer, or properly received or processed by a device. For example, the audio data and the video data for a television program are played back and displayed, respectively, synchronously when the combined data is perceived in the intended manner by an observer.

Device 120 and device 130 are additionally capable of processing, and/or synchronously displaying or playing back received data. For example, if video data is received by a video device (e.g. device 120 and/or device 130), then that device may visually display the data or data derived from the received data on a screen. Alternatively, if audio data is received by an audio-capable device (e.g. device 120 and/or device 130), then the device may audibly play back the data or data derived from the received data through a speaker. Device 120 and device 130 may additionally include a processor and/or a memory.

FIG. 1 additionally shows that agent 100 is connected to network 110. Agent 100 is capable of receiving commands from a device (e.g. from one or both of device 120 and device 130, or a third device) for the transmission of data, and transmitting a first stream of data to device 120 and a second stream of data to device 130, wherein the first and second streams of data are complementary data. Agent 100 in particular is capable of receiving and responding to a command to transmit a first stream of data to a first device over a network and a second stream of data to a second device over the network, wherein the first and second streams of data form complementary data. Agent 100 may include a processor and a memory in addition to a connection or connections to one or more networks.

Agent 100 may determine the timing of the transmission of data to the first and second devices such that the data, when displayed and/or played back in real-time by the first and second device, is properly synchronized. For example, if the first stream of data is video data corresponding to an audiovisual recording (e.g. a television program) and the second stream of data is audio data corresponding to the audiovisual program, then agent 100 may transmit the first and second streams of data such that someone in proximity to both the first and second devices observes the audiovisual program properly without any lag time between the video data and the audio data. Agent 100, to correctly time the transmission of the first and second streams of data for proper observation at the first and second device, may measure the respective time delays introduced due to propagation of the data through the network to the first and second devices, and compensate by delaying the first and second streams appropriately. For example, if network 110 is the Internet, agent 100 may use the Packet Internet Groper ("ping") utility (e.g. see Internet Control Message Protocol, RFC 792) to send a packet of data to each of the first and second devices, and measure the time taken for a response to each ping. Then, one half of the difference in the respective delay times is the relative delay that would be introduced into the transmissions of the data streams to the first and second device. The relative delay can be compensated by delaying the data stream corresponding to the shorter delay time by the relative delay amount.

Other methods of synchronizing that are well-known to those skilled in the art may also be used in conjunction with embodiments of the present invention.

Alternatively, data received at the first and second device may be stored in memory and displayed and/or played back from memory. The first and second streams of data may be displayed and/or played back in a properly synchronized fashion in this case as well. For example, agent 100 may transmit timing data to each of the first and second devices specifying the beginning time of display and/or playback from memory of the first and second data streams such that a user will observe the display and/or playback of the two streams of data in synchronicity. For example, agent 100 may transmit the message "begin playback at 4:00 p.m. Eastern Standard Time" to both the first and second devices. The first and second devices may then each begin the synchronous display and/or playback of their respective streams of data at 4:00 pm, Eastern Standard Time.

Alternatively, a user may issue a command to one of the devices (e.g., by pressing a button) to begin synchronous display and/or playback of data stored in the memories of the first and second devices. Such action may cause that device to transmit a notify signal to agent 100. Agent 100 may then determine the relative delay in the transmission paths to the first and second devices in the manner set forth earlier. Then, agent 100 may send a begin display and/or begin playback signal to each of the first and second devices wherein the begin display (or begin playback) signal corresponding to the shorter transmission path is delayed by the relative delay. If each device begins display and/or playback of the data from memory when it receives the begin display (or begin playback) signal from agent 100, then the first and second signals will be properly synchronized as observed by the user.

Figure 2:
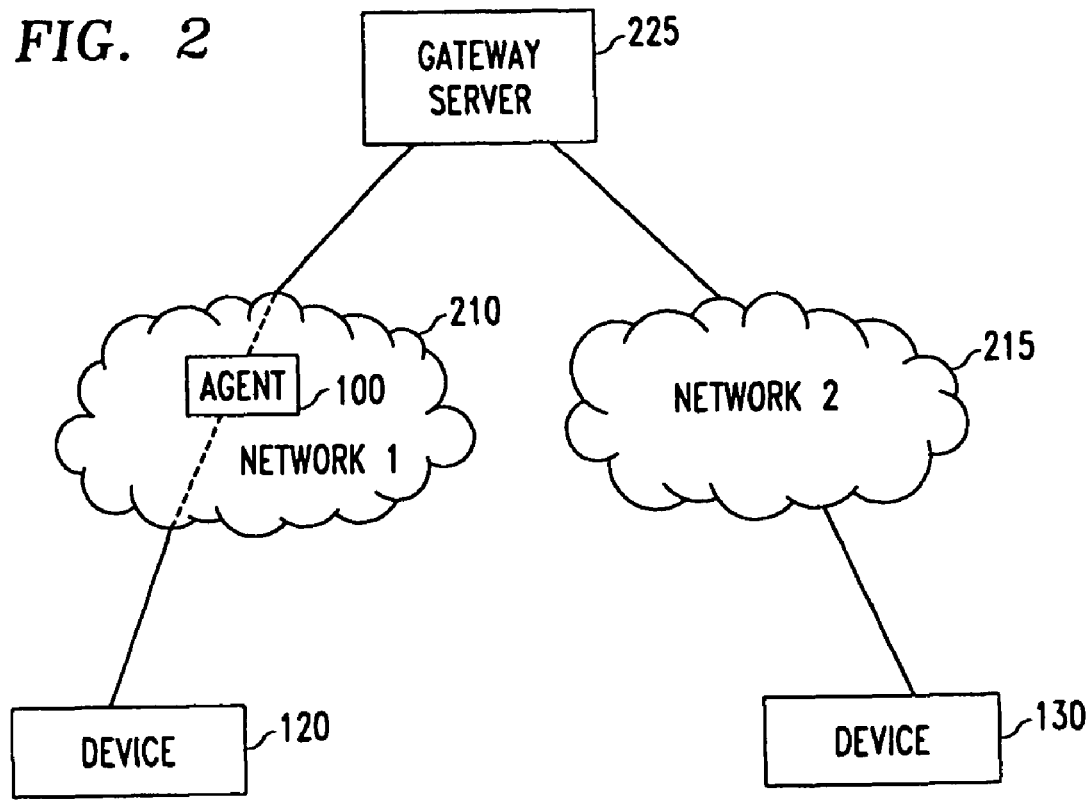
FIG. 2 illustrates a system in accordance with embodiments of the present invention in which a first device is connected through a first network and a second network to a second device.

FIG. 2 shows a system in accordance with embodiments of the present invention in which device 120 is connected to a first network 210 and device 130 is connected to a second network 215. Each of network 210 and network 215 may be the Internet, an intranet, a television network, a wireless network, a public switched telephone network, a combination of these networks, or any other network. Gateway server 225 is connected to both network 210 and network 215, and is capable of receiving commands and/or data from either network for transmission to a specified destination, properly formatting received commands and/or data for transmission through the other network, and transmitting the properly formatted data through the other network to the specified destination. FIG. 2 shows agent 100 to be a part of network 210, although agent 100 could instead be a part of network 215, or a part of both network 210 and network 215. Apart from the explicit indication of two different networks connected by a gateway server, the system shown in FIG. 1 is similar to that shown in FIG. 2.

Figure 3:
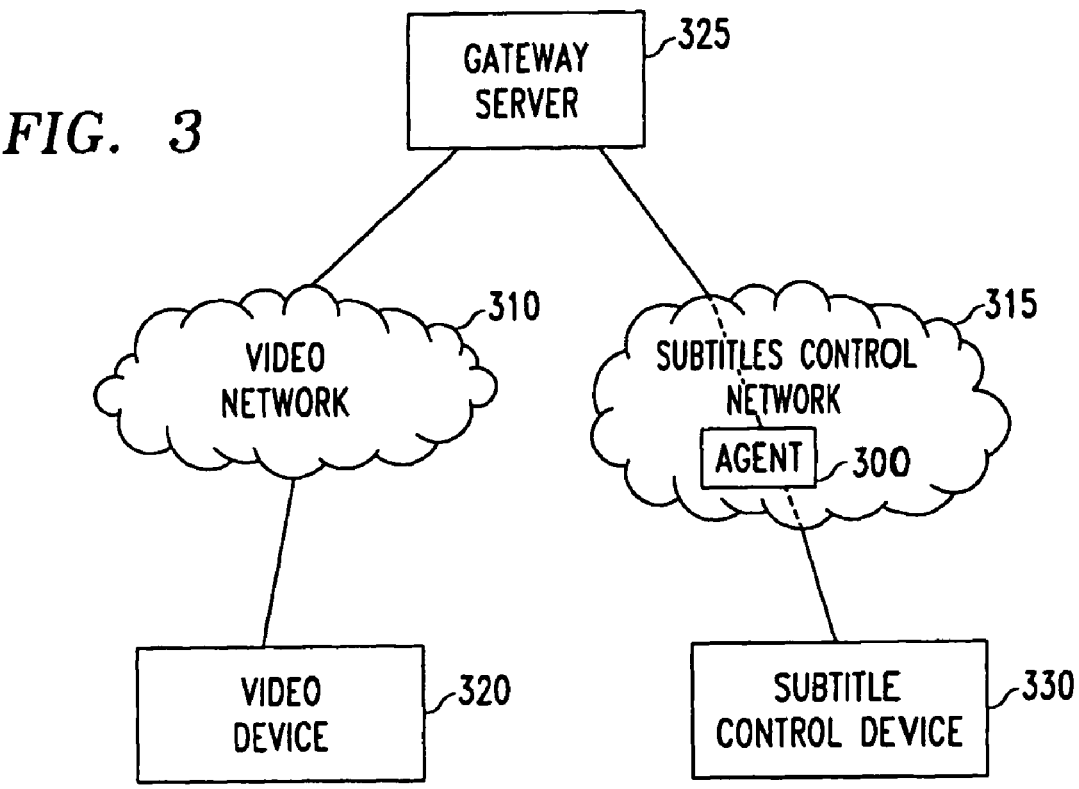
FIG. 3 illustrates a system in accordance with an embodiment of the present invention in which a video program is transmitted to a first device and corresponding subtitles are transmitted to a second device.

FIG. 3 shows a system in an embodiment of the present invention. In this embodiment, device 320 is a video device capable of displaying video data that is connected to network 310, which is a network capable of carrying the transmission of video data, e.g., the Internet or a television network. FIG. 3 additionally shows device 330, which is capable of displaying visual, textual data. Device 330 is connected to network 315, which is capable of carrying the transmission of textual data. Gateway 325 is connected to both network 310 and network 315, and is capable of receiving data and/or commands through at least one of the networks for transmission to a specified destination, properly formatting and translating the data and/or commands for transmission through the other network, and transmitting the formatted and translated data and/or commands though the other network to the specified destination. Agent 300 is capable of receiving commands from a device (e.g., one or both of device 320 and device 330, or a third device) for the transmission of data, and transmitting a first stream of data to device 320 and a second stream of data to device 330, wherein the first and second streams of data are complementary data. Agent 300 may also include a processor and a memory.

The system shown in FIG. 3 can in particular be of benefit to an audio-impaired user. For example, the user may employ a hand-held device (e.g. device 330) that is connected through a wireless network (e.g. network 315) to agent 300. In this implementation, the user, wishing to see subtitles corresponding to a video program being displayed on video device 320, may press a button on device 330 or otherwise issue a command to device 330 for displaying subtitles. Device 330 may transmit this request to agent 300. In response, agent 300, which is connected through gateway server 325 to network 310 (and capable of detecting and tracking the program being displayed on video device 320), may transmit properly synchronized subtitles corresponding to the program being displayed on video device 320, to device 330. In this manner, the user is able to observe the complementary data that forms the program in a manner that is maximally useful to him/her and not distracting to other viewers of the program being displayed on device 320. This embodiment may also be used where the program being displayed on video device 320 is in a language that is foreign to the user. In this case, agent 300 may transmit synchronized subtitles or audio signals in the user's language corresponding to the program, to device 330.

There are many other contexts in which the systems shown in FIGS. 1-3 can be of benefit. For example, a navigation system can be implemented with the option of audible output. In this context, device 120 in FIG. 1 or 2 is a navigation system installed in a vehicle that is capable of assisting the operator in navigating the vehicle. The navigation system may be connected through, for example, a wireless connection to the Internet (e.g. network 110 in FIG. 1 or network 210 in FIG. 2). Agent 100, which is connected to device 120 through network 110 (or 210), is capable of generating and transmitting supplementary information, or providing supplementary services, that can be used by the operator of the vehicle in connection with navigating the vehicle. For example, agent 100 may track the location of the vehicle through transmissions from device 120 and determine the location of services near the vehicle; e.g., the location of hospitals, banks, gasoline stations and other services in the vicinity of the current position of the vehicle. Agent 100 may then transmit this information, either through the same network (network 110 of FIG. 1) or through another network (e.g. network 215 of FIG. 215) to device 130, which is in possession of the operator of the vehicle. For example, device 130 may be a mobile, hand-held portable device (e.g., a personal digital assistant, a cellular phone, a pocket computer) that the operator can use even when not present inside the vehicle.

Alternatively, device 130 may be a device that receives and plays back audible instructions corresponding to directions displayed on the navigation system. For example, device 130 may play back instructions such as "turn left at the next intersection" that may allow the operator to receive navigational instructions without diverting his/her attention from the task of operating the vehicle.

Figure 4:
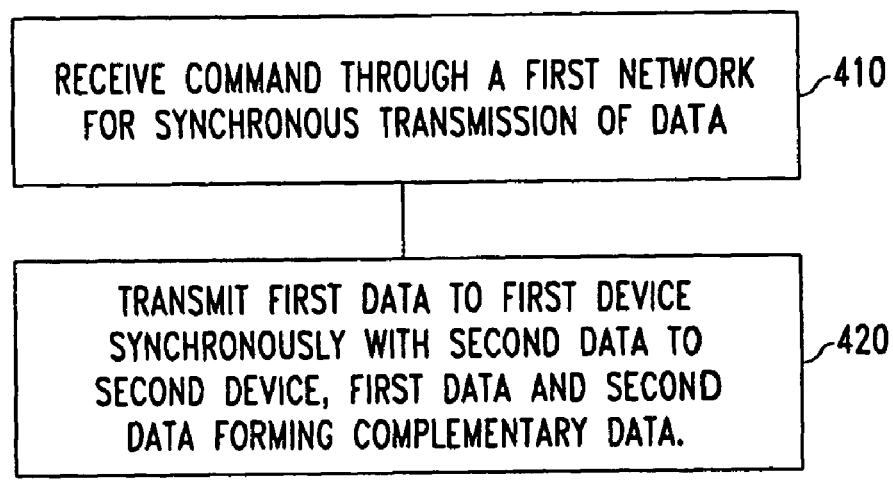
FIG. 4 illustrates a flow diagram of the steps in an embodiment of the present invention.

FIG. 4 shows an embodiment of the present invention. At step 410, a command is received through a network for the synchronous transmission of data. For example, agent 100 of FIG. 1 may receive a command from device 120, device 130 or a third device for the synchronous transmission of complementary data to device 120 and device 130.

At step 420, first data is transmitted to a first device synchronously with second data to a second device, wherein the first data and the second data are complementary. For example, agent 100 of FIG. 1 may synchronously transmit first data to device 120 and second data to device 130.

Figure 5:
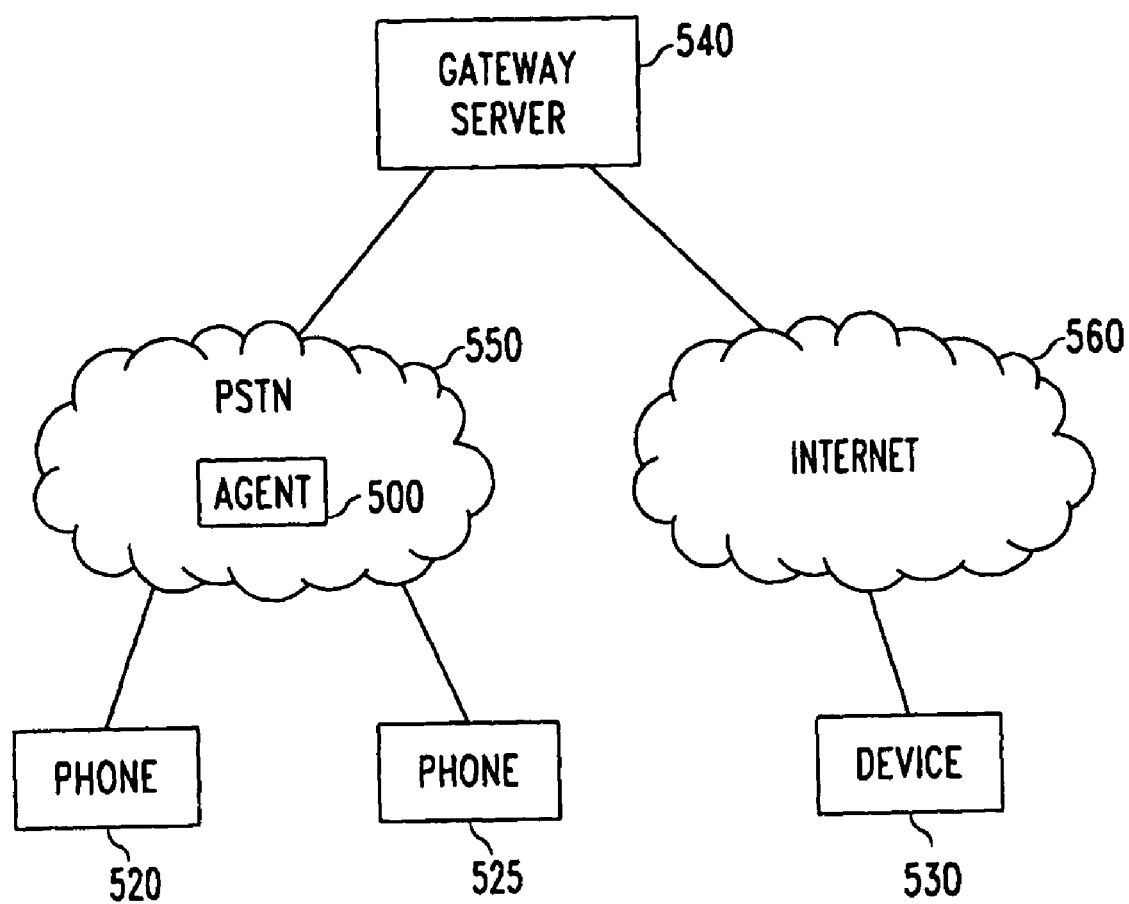
FIG. 5 illustrates a system in accordance with an embodiment of the present invention in which a device is used to control a telephone through a network.

In another aspect of the present invention, the systems shown in FIGS. 1 and 2 can be used for the remote control of devices without synchronous transmission of complementary data. For example, commands transmitted by device 120 through network 110 in FIG. 1 may cause agent 100 to in turn transmit commands to control device 130. One example of such a system is shown in FIG. 5. In FIG. 5, phone 520 and 525 are connected to the Public Switched Telephone Network ("PSTN") 550, which contains agent 500. PSTN 550 is connected to gateway server 540, which is in turn connected to Internet 560. Device 530 is connected to Internet 560, for example, through a wireless connection. In this embodiment, device 530 can transmit commands to cause phone 520, for example, to dial and connect to phone 525. In one application of this system, phone 520 is a head-phone that can be carried on the head of the operator, and device 530 is a personal digital assistant ("PDA") containing the address book of the operator. The operator can select an entry from the address book in PDA 530, for example, the entry corresponding to the telephone number for phone 525, for connection to phone 520. PDA 530 may then transmit a command through Internet 560, gateway 540 and PSTN 550 to agent 500 for connecting phone 520 to phone 525. Agent 500 may then connect phone 520 to phone 525. In this manner, a telephone may be controlled remotely through a network.

Variations of the systems shown in FIGS. 1 and 2 can be used to control other types of devices through a network in the same manner as just described for controlling phones. For example, the system shown in FIG. 1 or FIG. 2 can be used to control appliances (e.g., heating, cooling, lighting, music systems and other devices) in the same manner as described above, where device 120 is an appliance connected to a network of appliances.

Control of a device may pertain to either or both of i) controlling the setup of a communication channel with another device; and, ii) controlling the functionality of the device, or functionality in connection with the device, after a communication channel with another device has been established.

An advantage of an embodiment of the invention derives from the flexibility of a mobile and/or hand-held device such as a PDA being used to control another device through one or more networks, such that complementary, synchronous streams of data, intended for observation in combination by users and/or entities, can be transmitted to each of the PDA and the device.

A method and system have been disclosed for controlling devices through a network. In particular, a method and system have been disclosed for remotely controlling a device for the synchronous transmission of complementary data to a second and third device. The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for synchronously delivering complementary data to a first device and a second device, the method comprising:
　　receiving a command through a network for synchronous transmission of complementary data; and
　　transmitting first data through the network to the first device, the transmission of the first data synchronized with transmission of second data transmitted to the second device, the first and second data forming complementary data, the transmission of the first data synchronized with transmission of second data via a first time taken by the first device to respond to a Packet Internet Groper (ping) utility and a second time taken by the second device to respond to the Packet Internet Groper (ping) utility, the transmission of the first data synchronized with transmission of second data via introducing a time delay to at least one of the first data and the second data based upon the first time and the second time, wherein:

the network is a first network and second data is transmitted to the second device through a second network.

2. The method of claim 1 wherein the second network is a telephone network.

3. The method of claim 1 wherein the second network is a wireless network.

4. The method of claim 1 wherein each of the first data and the second data is one from a group consisting of audio data and video data.

5. A method for delivering first data through a network for playback or display on a first device in synchronicity with playback or display of second data on a second device, the first data and the second data forming complementary data, the method comprising:

receiving a command through the network for transmission of complementary data; and transmitting first data through the network to the first device for playback or display on the first device in synchronicity with playback or display of second data on the second device, wherein the first and second data form complementary data, the transmission of the first data synchronized with transmission of second data via a first time taken by the first device to respond to a Packet Internet Groper (ping) utility and a second time taken by the second device to respond to the Packet Internet Groper (ping) utility, the transmission of the first data synchronized with transmission of second data via introducing a time delay to at least one of the first data and the second data based upon the first time and the second time, wherein:

the network is a first network and second data is transmitted to the second device through a second network.

6. The method of claim 5 wherein the second network is a telephone network.

7. The method of claim 6 wherein the second network is a wireless network.

8. The method of claim 6 wherein each of the first data and the second data is one from a group consisting of audio data and video data.

9. A method for synchronously delivering complementary data to a device and a PDA, the method comprising:

receiving a command from the PDA through a first network, the first network including a wireless network;

transmitting first data to through the first network; and transmitting second data through a second network, the transmission of the second data synchronized with the transmission of the first data, the first and second data forming complementary data, wherein the first data is transmitted to the PDA, the transmission of the first data synchronized with transmission of second data via a first time taken by the first device to respond to a Packet Internet Groper (ping) utility and a second time taken by the second device to respond to the Packet Internet Groper (ping) utility, the transmission of the first data synchronized with transmission of second data via introducing a time delay to at least one of the first data and the second data based upon the first time and the second time.

10. The method of claim 9 wherein the first data is played on the PDA.

11. The method of claim 10 wherein the first data is textual data that is displayed on the PDA.

12. The method of claim 10 wherein the first data is audio data.

* * * * *